United States Patent [19]

Zaremba

[11] Patent Number: 4,774,786
[45] Date of Patent: Oct. 4, 1988

[54] PISTOL-GRIP, ELASTIC-OPERATED INSECT SWATTER

[76] Inventor: Tadeusz Zaremba, 2602 Haverhill, Houston, Tex. 77008

[21] Appl. No.: 933,797

[22] Filed: Nov. 24, 1986

[51] Int. Cl.$^4$ .............................................. A01M 5/02
[52] U.S. Cl. ...................................... 43/135; 43/137; 124/18
[58] Field of Search ...................... 43/135, 137; 124/7, 124/17, 18, 35

[56] References Cited

U.S. PATENT DOCUMENTS

| | | | |
|---|---|---|---|
| 1,059,736 | 4/1913 | Kilduff | 124/18 |
| 1,206,773 | 11/1916 | Boyle | 43/135 |
| 1,237,346 | 8/1917 | Limoge | 43/135 |
| 1,457,674 | 6/1923 | Kennedy et al. | 43/135 |
| 1,526,505 | 2/1925 | Beardm | 43/135 |
| 1,597,140 | 8/1926 | Barto | 43/135 |
| 1,616,483 | 2/1927 | Bill | 124/18 |
| 3,292,299 | 12/1966 | Mittler | 43/135 |
| 3,704,981 | 12/1972 | Pohr | 43/135 |

Primary Examiner—Nicholas P. Godici
Assistant Examiner—Karen Skillman
Attorney, Agent, or Firm—Neal J. Mosely

[57] ABSTRACT

A pistol-grip, elastic-operated insect swatter is disclosed which comprises a supporting hand gun member with a pistol hand grip and an elongated barrel extending outwardly therefrom. The outermost end of the barrel is downturned or, if straight, has a downwardly curved surface at the end. An elongated flat band of elastic material has one end secured to the downturned end portion of the barrel is substantially shorter than the length of the barrel. An insect-swatting pad has one side secured on the other end of the band of elastic material. A firing and retaining trigger, is positioned adjacent to the handle and is operable in one position, upon stretching of the band, to receive and secure the swatting pad. The firing and retaining mechanism, i.e. trigger, is operable upon movement to another position to release the pad for movement by the stretched band with a snapping movement to swat at an insect. The downturned barrel end portion has projecting tabs on opposite edges thereof providing a guide for the elastic band without interfering with the snapping movement of the swatting pad. Several release mechanisms are shown, including a hook on the trigger which secures and releases the swatting pad, an abutment on the barrel which secures and releases the swatting pad, and a clamp operated by the trigger.

3 Claims, 3 Drawing Sheets

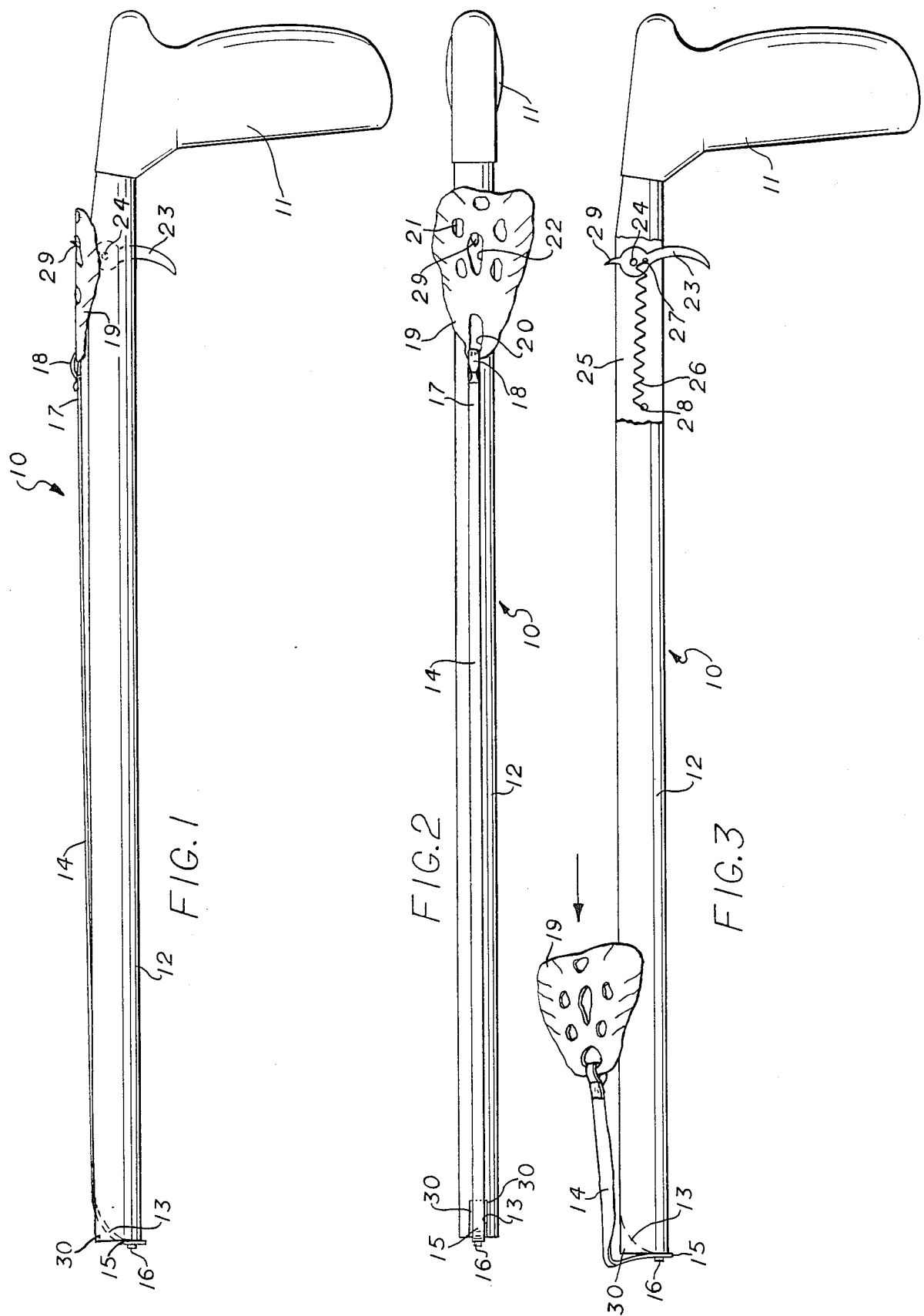

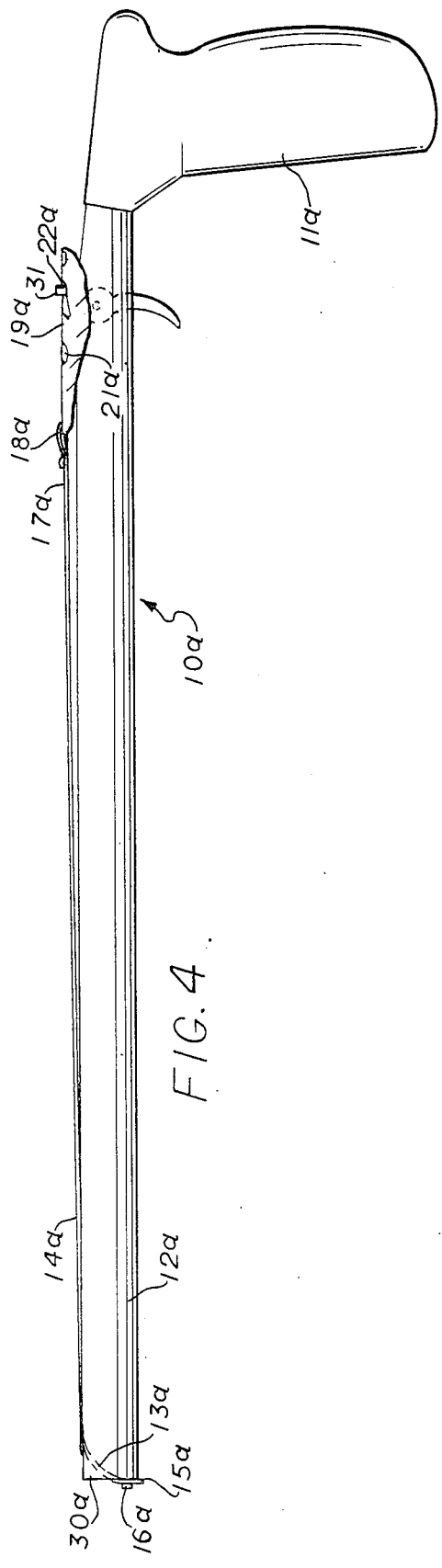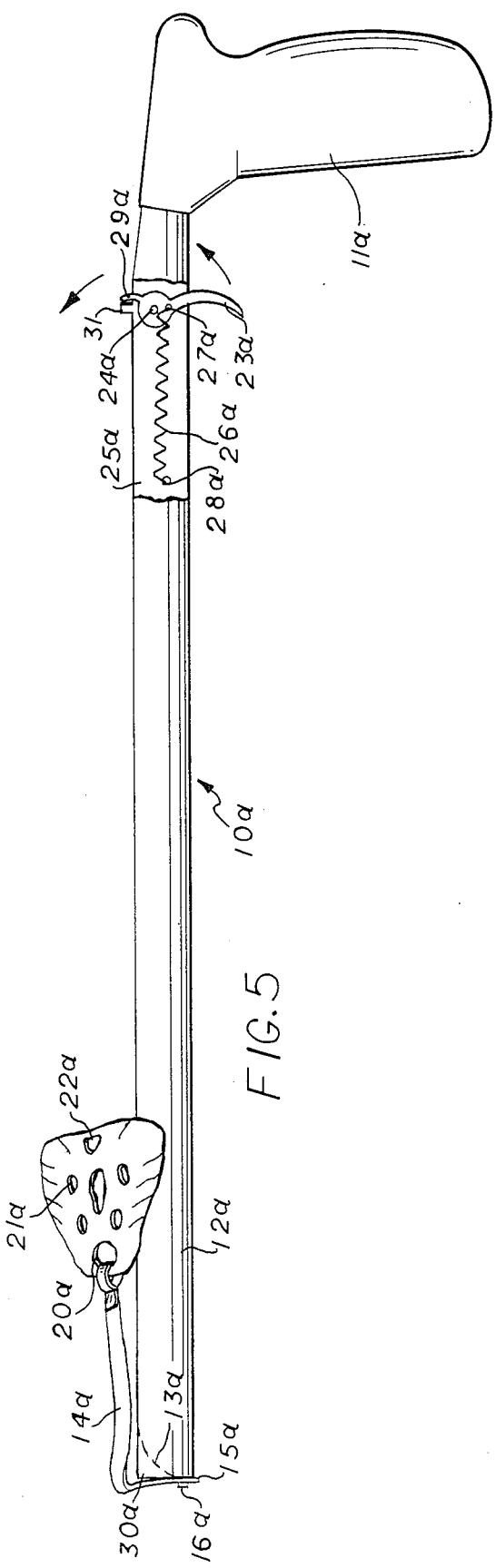

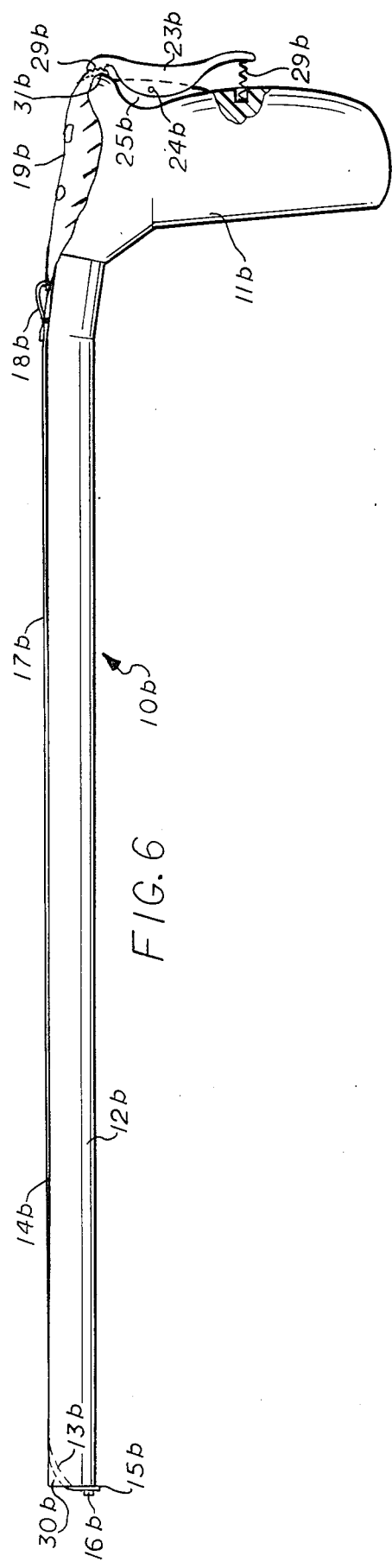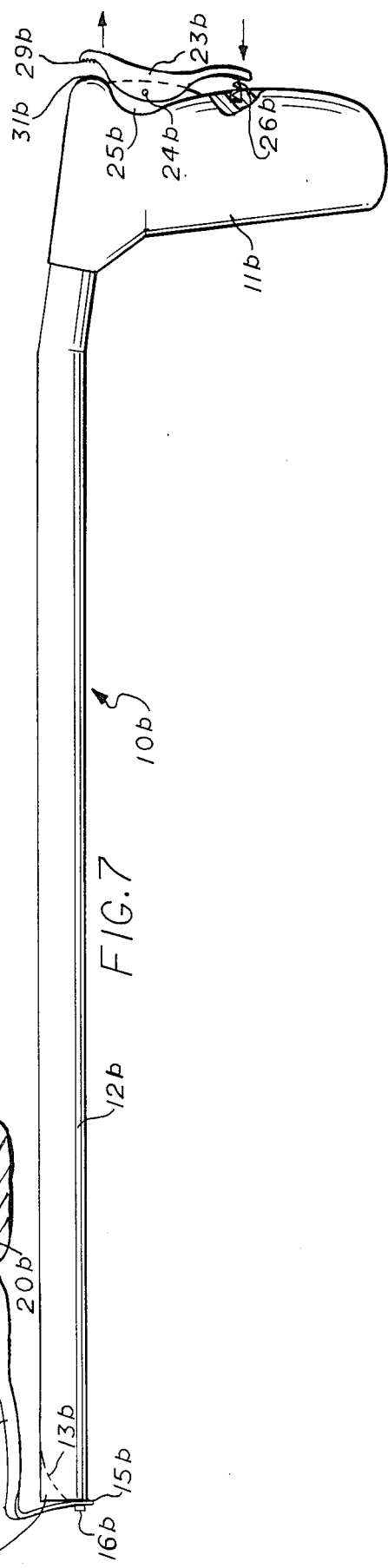

PISTOL-GRIP, ELASTIC-OPERATED INSECT SWATTER

BACKGROUND OF THE INVENTION

1. Field of the Invention

This invention relates to improvements in insect swatters and more particularly to an improved pistol-grip, elastic-operated insect swatter.

2. Brief Description of the Prior Art

Manually operated insect swatters are so well known in the prior art as to require no comment. Some spring operated insect swatters are known, either as serious attempts to improve the art or as toys or novelty items.

Stanfield U.S. Pat. No. 1,108,269 discloses a toy fly swatter having a swatting pad on the end of a leaf spring carried by a pistol grip device and releasable by a trigger mechanism for swatting action.

Jahr U.S. Pat. No. 1,204,777 discloses an insect swatter having a swatting pad on the end of a leaf spring carried by a long rod and releasable by a trigger mechanism for swatting action.

Boyle U.S. Pat. No. 1,206,773 discloses a toy fly swatter having spring carried by a pistol grip device with a swatting pad formed of the spring metal and releasable by a trigger mechanism for swatting action.

Reardon U.S. Pat. No. 1,526,505 discloses a toy fly swatter as a projectile fires by a spring operates mechanism on a rifle-like member.

Grunkemeyer U.S. Pat. No. 2,578,352 discloses a fly swatter having a swatting pad fired as a projectile from a hand-held elastic band.

Mettler U.S. Pat. No. 3,292,299 discloses a fly swatter having a swatting pad on the end of a wire torsion spring carried by a handle and releasable by a trigger mechanism for swatting action.

Pohr U.S. Pat. No. 3,708,981 discloses an elastic band carried by a pistol grip device and releasable by a trigger mechanism for swatting action with the free end of the band.

These references in particular and the prior art in general do not disclose a pistol grip elastic operated insect swatter of the simplicity of construction and ease of operation of the present invention.

SUMMARY OF THE INVENTION

One of the objects of this invention is to provide a new and improved mechanically operated insect swatter.

Another object of the invention is to provide a mechanically operated insect swatter having a pistol grip and mechanical release.

Another object of the invention is to provide a mechanically operated insect swatter having a pistol grip and trigger release.

Still another object of the invention is to provide a mechanically operated insect swatter having a pistol grip, powered by an elastic band to which a swatter pad is secured, and mechanical release.

Still another object of the invention is to provide a mechanically operated insect swatter having a pistol grip, powered by an elastic band to which a swatter pad is secured, and trigger release.

Still another object of the invention is to provide a mechanically operated insect swatter having a pistol grip, powered by an elastic band to which a swatter pad is secured, a trigger release, and a guide for the elastic band for accuracy in firing.

Other objects of the invention will become apparent from time to the time throughout the specification and claims as hereinafter related.

These and other objects of the invention are accomplished by providing a pistol-grip, elastic-operated insect swatter having a supporting hand gun member with a pistol hand grip and an elongated barrel extending outwardly therefrom. The outermost end of the barrel is downturned and has an elongated flat band of elastic material secured thereon which is substantially shorter than the length of the barrel. An insect-swatting pad is secured on the outer end of the band of elastic material and retained and released by a trigger mechanism. The trigger is operable upon movement to release the pad for movement by the stretched band with a snapping movement to swat at an insect. The downturned barrel end portion has projecting tabs on the edges thereof providing a guide for the elastic band without interfering with the snapping movement of the swatting pad.

BRIEF DESCRIPTION OF THE DRAWINGS

FIG. 1 is a view in side elevation of a pistol-grip, elastic-operated insect swatter illustratign a preferred embodiment of the invention.

FIG. 2 is a top plan view of the pistol-grip, elastic-operated insect swatter shown in FIG. 1.

FIG. 3 is a view in side elevation of the pistol-grip, elastic-operated insect swatter of FIG. 1 in operation.

FIG. 4 is a view in side elevation of a pistol-grip, elastic-operated insect swatter illustrating a another embodiment of the invention, where the trigger release mechanism dislodges the swatting pad from a retaining abutment.

FIG. 5 is a view in side elevation of the pistol-grip, elastic-operated insect swatter of FIG. 4 in operation.

FIG. 6 is a view in side elevation of a pistol-grip, elastic-operated insect swatter illustrating a another embodiment of the invention, where the trigger release mechanism comprises a spring operated clamp for the swatting pad.

FIG. 7 is a view in side elevation of the pistol-grip, elastic-operated insect swatter of FIG. 6 in operation.

DESCRIPTION OF A PREFERRED EMBODIMENT

Referring to the drawings by numerals of reference, and more particularly to FIGS. 1-3, there is shown a pistol-grip, elastic-operated insect swatter 10 illustrating one preferred embodiment of this invention. Insect swatter 10 comprises a supporting hand gun member having a pistol hand grip 11 and an elongated barrel 12 extending therefrom with an outer downturned or downwardly curved end surface 13.

The swatter mechanism comprises elongated band 14 of an elastic material such as rubber, synthetic rubber or the like. One end 15 of band 14 is secured to the downturned end portion or downwardly curved end surface 13 of barrel 12 by a rivet or screw 16 or other suitable securing means. With some materials of construction, e.g. certain plastics, band 14 can be heat sealed to downturned end portion or downwardly curved end surface 13 of barrel 12. As seen in FIG. 3, the band 14 is substantially shorter than the barrel 12.

The other end 17 of band 14 has an end loop 18 extending through opening 20 in an insect-swatting pad 19. End loop 18 may be secured by knotting, by metal or plastic clips or the like, on any other suitable retaining means. Alternatively, end loop 18 could be a snap hook for connection to opening 20 in swatting pad 19. The swatting pad 19 has a plurality of openings 21 for air flow and a center opening 22 for connection to a trigger mechanism, as described below.

The trigger mechanism comprises a trigger 23 supported on a pivot 24 in a slot 25 in barrel 12. Trigger 23 is biased in a clockwise direction by spring 26 secured at point 27 on trigger 23 and at point 28 on the wall of slot 25. The connection of spring 26 to the trigger 23 and wall of slot 25 is by a pin or other suitable mechanism. In the initial position, trigger 23 is rotated in a clockwise direction until it abuts the end of slot 25.

The upper, pointed end 29 fits the opening 22 in swatting pad 19 to secure the pad in a stretched position as shown in FIGS. 1 and 2. The downturned end portion or downwardly curved end surface 13 of barrel 12 has projecting tabs 30 on opposite edges thereof providing a guide for said elastic band. Tabs 30 are preferably located entirely on the downturned end portion 13 of barrel 12 at a location where they do not interfere with the swatting movement of the swatter in operation. Tabs 30 are formed by the slotted downwardly curved surface at the end of barrel 12.

OPERATION

The operation of this apparatus is simple. The elastic band 14 is substantially shorter than the barrel 12 and the band is stretched until opening 22 of swatter pad 19 fits over the pointed end 29 of trigger 23. Spring 26 is stronger than the elastic band 14 so that the loaded position of the apparatus is as shown in FIG. 1. When trigger 23 is pulled by the finger of the operator in a predetermined counterclockwise movement, swatting pad 19 is released, as shown in FIG. 3 for a snapping movement to a point beyond the end 13 of barrel 12. The device can be aimed with considerable accuracy.

DESCRIPTION OF ANOTHER PREFERRED EMBODIMENT

In FIGS. 4 and 5, there is shown a pistol-grip, elastic-operated insect swatter 10a illustrating another preferred embodiment of the invention. Insect swatter 10a comprises a supporting hand gun member having a pistol hand grip 11a and an elongated barrel 12a extending therefrom with an outer downturned end portion or downwardly curved end surface 13a.

The swatter mechanism comprises elongated band 14a of an elastic material such as rubber, synthetic rubber or the like. One end 15a of band 14a is secured to the downturned end portion or downwardly curved end surface 13a of barrel 12a by a rivet or screw 16a or other suitable securing means. With some materials of construction, e.g. certain plastics, band 14a can be heat sealed to downturned end portion or downwardly curved end surface 13a of barrel 14. As seen in FIG. 5, band 14a is substantially shorter than barrel 12a.

The other end 17a of band 14a has an end loop 18a extending through an opening 20a in an insect-swatting pad 19a. End loop 18a may be secured by knotting, by metal or plastic clips or the like, on any other suitable retaining means. Alternatively, end loop 18a could be a snap hook for connection to opening 20a in swatting pad 19a. The swatting pad 19a has a plurality of openings 21a for air flow and a center opening 22a for connection to a trigger mechanism, as described below.

The trigger mechanism comprises a trigger 23a supported on a pivot 24a in a slot 25a in barrel 12a. Trigger 23a is biased in a clockwise direction by spring 26a secured at point 27a on trigger 23a and at point 28a on the wall of slot 25a. The connection of spring 26a to the trigger 23a and wall of slot 25a is by a pin or other suitable mechanism. In the initial position, trigger 23a is rotated in a clockwise direction until it abuts the end of slot 25a. An upwardly extending abutment 31 on barrel 12a fits the opening 22a in the edge portion of swatting pad 19a to secure the pad in a stretched position as shown in FIG. 4.

The upper end portion 29a of trigger 23a is positioned to lift the outer end of swatting pad 19a on counterclockwise rotation thereof. The downturned end portion or downwardly curved end surface 13a of barrel 12a has projecting tabs 30a on opposite edges thereof providing a guide for said elastic band. Tabs 30a are preferably formed by the slotted downwardly curved end surface 13a of barrel 12a and do not interfere with the swatting movement of the swatter in operation. If tabs 30a extend onto the top of barrel 12a they must be tapered sufficiently so that there is no interference with the swatting movement.

OPERATION

The operation of this apparatus is simple. Elastic band 14a is substantially shorter than the barrel 12a and the band is stretched until opening 22a of swatter pad 19a fits over the abutment 31 on barrel 12a. Spring 26a is strong enough to hold trigger 23a in the loaded position shown in FIG. 4. When trigger 23a is pulled by the finger of the operator in a predetermined counterclockwise movement, the end portion 29a dislodges swatting pad 19a from abutment 31, as shown in FIG. 5, for a snapping movement to a point beyond the end 13a of barrel 12a. The device can be aimed with considerable accuracy.

DESCRIPTION OF STILL ANOTHER PREFERRED EMBODIMENT

In FIGS. 6 and 7, there is shown a pistol-grip, elastic-operated insect swatter 10b illustrating another preferred embodiment of this invention. Insect swatter 10b comprises a supporting hand gun member having a pistol hand grip 11b and an elongated barrel 12b extending therefrom with an outer downturned end portion or downwardly curved end surface 13b.

The swatter mechanism comprises elongated band 14b of an elastic material such as rubber, synthetic rubber or the like. One end 15b of band 14b is secured to the downturned end portion or downwardly curved end surface 13b of barrel 12b by a rivet or screw 16b or other suitable securing means. With some materials of construction, e.g. certain plastics, band 14b can be heat sealed to downturned end portion or downwardly curved end surface 13a of barrel 14. As seen in FIG. 7, band 14b is substantially shorter than barrel 12b.

The other end 17b of band 14b has an end loop 18b extending through an opening 20b in an insect-swatting pad 19b. End loop 18b may be secured by knotting, by metal or plastic clips or the like, on any other suitable retaining means. Alternatively, end loop 18b could be a snap hook for connection to opening 20b in swatting pad 19b. The swatting pad 19b has a plurality of openings 21b for air flow and a center opening 22b for connection to a trigger mechanism, as described below.

The trigger mechanism comprises a trigger 23b supported on a pivot 24b in a slot 25b in handle 11b. Trigger 23b is biased in a counterclockwise direction by compression spring 26b. In the initial position, trigger 23b is rotated in a counterclockwise direction until it abuts the end 31b of handle 11b. The swatting pad 19b is clamped in a stretched position as shown in FIG. 6. The downturned end portion 13a of barrel 12b has projecting tabs 30b on opposite edges thereof providing a guide for said elastic band. Tabs 30b are preferably formed by the slotted downwardly curved end surface 13b of barrel 12b at a rotation where they do not interfere with the swatting movement of the swatter in operation. If tabs 30b extend onto the top of barrel 12b they must be tapered sufficiently so that there is no interference with the swatting movement.

OPERATION

The operation of this apparatus is simple. The elastic band 14b is substantially shorter than the barrel 12b and the band is stretched until opening 22b of swatter pad 19b is clamped between the end 29b of trigger 23b and the end portion 31b of handle 11b. Spring 26b is strong enough to hold trigger 23b in the loaded position shown in FIG. 6. When trigger 23b is pulled by the finger of the operator in a clockwise movement, swatting pad 19b is released, as shown in FIG. 7, for a snapping movement to a point beyond the end 13b of barrel 12b. The device can be aimed with considerable accuracy.

While this invention has been described fully and completely, with emphasis on certain preferred embodiments, it should be understood that, within the scope of the appended claims, this invention may be practiced otherwise than as specifically shown herein.

I claim:

1. A pistol-grip, elastic-operated insect swatter comprising
    a supporting hand gun member having a pistol hand grip and an elongated barrel extending therefrom with an outer downturned end portion or downwardly curved end surface,
    an elongated band of elastic material having one end secured to the downturned end portion or downwardly curved end surface of said barrel and having a length substantially shorter than the length of said barrel,
    an insect-swatting pad secured on the other end of said band of elastic material,
    said insect swatting pad having a plurality of openings distributed over the surface thereof,
    said downturned barrel end portion or downwardly curved end surface has tabs on opposite edges and below the upper surface of the barrel providing a guide for said elastic band,
    firing and retaining means adjacent to said handle operable in one position, upon stretching of said band, to receive and secure one of the openings in said pad, and
    said firing and retaining means being operable upon movement to another position to release said pad for movement by said band with a snapping movement to swat at a selected position for killing an insect located there,
    said firing and retaining means adjacent to said handle comprises a trigger mechanism with an extended portion operable in one position, upon stretching of said band, to receive and secure one of the openings in the side of said pad opposite the point of attachment to said elastic band, and upon movement to another position to disengage said one opening and release said pad for said swatting movement.

2. A pistol-grip, elastic-operated insect swatter according to claim 1 in which
    said firing and retaining means adjacent to said handle comprises a trigger mechanism with an extended hook portion operable in one position, upon stretching of said band, to receive and secure one of said openings in said pad and upon movement to another position to release said pad one opening from said hook for said swatting movement.

3. A pistol-grip, elastic-operated insect swatter according to claim 1 in which
    said firing and retaining means adjacent to said handle comprises abutment means on said barrel adjacent to said handle operable, upon stretching of said band, to fit said one opening and secure the side of said pad opposite the point of attachment to said elastic band, and
    a trigger mechanism with an extended portion operable on movement to dislodge said pad one opening from said abutment means to release said pad for movement by said band with a snapping movement to swat at a selected position for killing an insect located there.

* * * * *